United States Patent [19]

Luthra et al.

[11] Patent Number: 5,215,585
[45] Date of Patent: Jun. 1, 1993

[54] HYDRATION RETARDER

[75] Inventors: Narender P. Luthra, Columbia; Charles G. Carter, Silver Spring, both of Md.; Paul C. Scheiner, Maynard, Mass.

[73] Assignee: W. R. Grace & Co.-Conn., New York, N.Y.

[21] Appl. No.: 782,356

[22] Filed: Oct. 25, 1991

[51] Int. Cl.$^5$ .............................................. C04B 7/36
[52] U.S. Cl. .................................... 106/806; 106/819
[58] Field of Search ....................... 106/810, 806, 819; 562/23, 24

[56] References Cited

U.S. PATENT DOCUMENTS 4,089,895  5/1978  Carr .............................. 260/502.4 R
4,964,917  10/1990  Bobrowski et al. ................. 106/804

Primary Examiner—Mark L. Bell
Assistant Examiner—A. Wright
Attorney, Agent, or Firm—Howard J. Troffkin

[57] ABSTRACT

A method of reclaiming unset cement compositions by mixing a polymethoxy polyphosphonate to the unset composition to cause long-term retardation of cement hydration and subsequently treating the composition with a set accelerator to reinitiate hydration.

10 Claims, No Drawings

HYDRATION RETARDER

BACKGROUND OF THE INVENTION

The present invention is directed to a cement admixture and a method of using the same for the purpose of reclaiming unset cement compositions for future use. The present invention is, in particular, directed to reclaiming unset mortar compositions (a mixture of a Portland cement, small aggregate and water) or concrete compositions (a mixture of a Portland cement, small aggregate such as sand, large aggregate such as gravel and stone, and water) by introducing a specific polymethoxy diphosphonate compound to the concrete composition.

It is general practice that a concrete truck is loaded with the components required to form a concrete along with a small amount of water with the remaining water component (total water to cement ratio is normally in the range of from about 0.3 to 0.6) added at the job site. In general, excess concrete is delivered to the job site to assure that the structure is formed by a single casting. After completion of its delivery, the concrete truck must be taken to a disposal site where the excess concrete is removed from the truck and dumped. Similarly, mortar mixes formed at a job site may not be completely used during the days activities and the excess at the end of the day is normally dumped. These practices are both economically and environmentally undesirable.

Recently, U.S. Pat. Nos. 4,676,832 and 4,964,917 disclosed a method of reclaiming unset concrete by the addition of a retarding agent to the concrete. Although retarding agents are well known in the cement industry, they normally provide short periods of retardation of the set and are not subject to reversibility. However, the above patents disclose that certain specific agents are capable of giving extended set retardation and the treated concrete can be reactivated and used as part of a fresh composition. The agents disclosed are polyphosphonic acids which contain amino and/or hydroxyl groups, such as N-nitrilo tris(methylene phosphonic acid); 1,2-ethanediyl bis[nitrilo di(methylene phosphonic acid)]; 1,6-hexanediyl bis[nitrilo di(methylene phosphonic acid)] and the like. These compounds are conventionally formed from an appropriate amine or ammonia. Such reagents require special handling due to their known toxicity and corrosive nature. The compound suggested by the references are thus difficult to form and, therefore, do not provide a cost effective reclamation means, as is required in the cost conscious cement industry.

It is highly desired to have an agent which is capable of retarding or stopping the hydration of wet cement based compositions while permitting reactivation to provide useable concrete for latter application. However, the means of achieving this desired result must be done with inexpensive, readily attainable agents, otherwise there are no economic advantages.

SUMMARY OF THE INVENTION

The present invention is directed to an economically desired admixture for cement compositions which causes long acting retardation or stoppage of the hydration of the cement while permitting reversal of the action to continue hydration and permit setting (curing) of the cement composition. Specifically, the present invention is directed to the use of polymethoxy polyphosphonic acids, as fully described below.

DETAILED DESCRIPTION

The present invention is directed to an improved admixture and process for long-term retardation of hydration of portland cement based compositions which can be reversed to again provide an active curable composition.

The present invention utilizes at least one polymethoxy polyphosphonic acid compound or its alkali or alkaline earth metal salts. These compounds are represented by

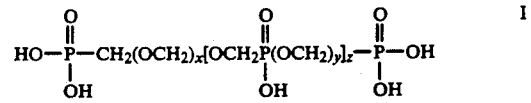

wherein x and y are each an integer of from 1-3, and preferably 1 and z is an integer of 0 or 1. It is understood that when z is 0 the radical within the bracket is nonexistent and, therefore $(OCH_2)y$ is nonexistent. The preferred polymethoxy polyphosphonic acid compounds are represented by the above formula when $z=0$ and x is 1-3, most preferably 1, as shown by the formula

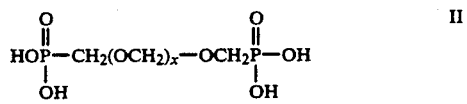

The present compounds are formed from inexpensive, readily available starting reagents of formaldehyde and phosphorous acid. The formaldehyde may be an aqueous formaldehyde solution or a formaldehyde polymer, such as trioxane, paraformaldehyde or the like. A method of forming the polymethoxy polyphosphonic acid involves subjecting a mixture of phosphorous acid and formaldehyde or a formaldehyde polymer to an elevated temperature of from about 80° C. to 200° C., preferably from about 100° C. to 180° C. for a time to allow the reactants to condense to form the desired product. The particular product will depend on the molar ratio of the formaldehyde to phosphorous acid present in the reaction zone.

The reaction of phosphorous acid and formaldehyde or formaldehyde polymer first condenses to produce hydroxymethylphosphonic acid. When the presence of formaldehyde is limited, two moles of hydroxymethylphosphonic acid react with one additional mole of formaldehyde to provide the polymethoxypolyphosphonic acid of the above general formula where x equals 1 and z equals 0. If excess amounts of formaldehyde are present (e.g. two or more moles of formaldehyde per mole of initial intermediate, hydroxymethyl phosphonic acid), additional moles of formaldehyde will react and extend the chain to form a hydroxyl terminated polymethoxy phosphonic acid which will terminate chain extension by reacting with another formaldehyde and a hydroxymethylphosphonic acid. The chain, under acidic conditions, is not highly stable and, therefore, the product normally has a short bridging chain of from 1 to 3 methoxy groups.

When high molar ratios of formaldehyde to phosphorous acid are used, the phosphonic acid group can be esterified to provide an internal >P(=O) OH group in the chain bridging the two terminal phosphonic acid groups.

It is known that these products are best formed under substantially anhydrous conditions. The most preferred compound is represented by the above formula where x is 1 and z is o. The process for forming these products is thoroughly described in U.S. Pat. No. 5,017,306, the teachings of which are expressly incorporated herein by reference.

The subject compounds of the present invention may be selected from one of the polymethoxypolyphosphonic acid agents or a mixture thereof. In addition, the agents may further contain some precursor hydroxymethylphosphonic acid. The subject agents are preferably converted to their alkali metal (e.g. sodium) salt to stabilize the material, especially when stored in aqueous solution form.

It has been presently found that the subject polymethoxypolyphosphonic acid agents described above can be mixed with still unset cement compositions and cause the hydration of the cement therein to be greatly retarded or substantially inhibited. Further, it has been found that a so treated cement composition can be returned to hydration and setting as a conventional cement composition by subsequent application of conventional cement set accelerating agents, as described herein below.

The subject cement admixture can be supplied as an aqueous solution having the polymethoxypolyphosphonic acid agent present in from about 30 to 70 percent by weight. The subject agents are stable in water, especially as the alkali or alkaline earth metal salt, preferably an alkali metal salt. In addition, the aqueous admixture solution may contain conventional cement additives such as conventional set retarders as, for example, hydroxycarboxylic acids (citric, gluconic, tartaric, and the like); carbohydrates (sucrose, fructose and the like); polycarboxylic acids (polyfumaric, polyacrylic, polymethacrylic and the like); and salts of lignin sulfonic acid.

The present polymethoxypolyphosphonic acid cement admixture is mixed with the cement compositions to be treated in amounts which are effective to cause retardation of set for the desired period. The specific effective amount will depend on the length of period desired and the particular cement-based composition being treated. Normally, low dosages of from 0.1 to 1 percent (preferably from 0.2 to 0.6 percent) by weight of solid agent based on the cement content of the treated composition provides greater than 24 hours of retardation. Set inhibition of 60 hours (sufficient for weekend treatment) can be achieved with the present agent.

The treated cement composition can be reactivated and reused alone or as part of a new composition. The treated cement composition may be mixed with a freshly prepared cement composition in a weight ratio of from about 10:1 to 1:10, preferably from about 1:1 to 1:5. The newly prepared cement composition is treated with a conventional accelerator either by adding the accelerating agent to the freshly prepared cement composition, to the prior retarded cement composition or preferably to the newly prepared combined composition.

The accelerators of use in reactivating the cement composition can be selected from conventional cement accelerators such as those classified as ASTM C494 Type C admixtures. These include alkali metal halides (calcium chloride and the like), alkali metal nitrites (calcium nitrite and the like), alkali metal nitrates (calcium nitrate and the like), alkali metal formates (calcium formate and the like), alkali metal thiocyanates (sodium thiocyanate and the like), triethanolamine and the like. The particular set accelerator to be used will depend on the known nature of the accelerators and side effects of the agent. For example, where metal corrosion is not a problem, calcium chloride might be chosen while if corrosion is a problem the nitrite or nitrate salts might be better used. The preferred accelerators are calcium nitrite, calcium nitrate and the like.

The accelerating agent should be added in amounts which effectively causes the reactivated combined cement composition to set and provide conventional 28 day strength for such compositions (e.g. mortars of about 3000–4000 psi; concrete of about 5,000 to 10,000 psi). The amount, based on cement content, should be from about 0.5 to 6 weight percent, preferably from about 1–5 percent.

As with other cement compositions, the reactivated cement composition can be treated with other conventional admixtures such as water-reducing agents, superplasticizers, strength enhancers and the like as is well known to those skilled in this art.

The following examples are given for illustrative purposes only and are not meant to be a limitation on the appended claims. All parts and percentages are by weight unless otherwise indicated.

Portland cement mortar compositions were formed by mixing 20 parts of portland cement, 45 parts of a standard mortar sand and 9 parts water (water-to-cement ratio of 0.45) and 0.08 part of solid diphosphonomethyl formal (Formula II wherein x=1 and z=0)/hydroxy methyl phosphonic acid (2:1 wt. ratio) as a 30% (Sample A) and a 50% (Sample B) aqueous solution. In addition, for comparative purposes, a sample of the same mortar composition was mixed without the addition of the subject admixture (Sample C).

Part of each of the above prepared samples were allowed to sit in their container and observed the length of time each took to have initial set. Sample A took 35 hours; Sample B took 60 hours; while Sample C took only 3.5 hours.

After 24 hours part of each of the above Samples A and B is mixed with freshly prepared mortar composition having the same ratio of cement, sand and water as above. The mix is in a 1 to 4 part ratio. The mixture is then treated with 2 parts of calcium nitrite solid based on the calculated cement content of the mixture being treated. Treated Sample A and Sample B cured to initial set within 6 hours and have compressive strengths of over 4,000 psi.

What is claimed:

1. A method of reclaiming an unset cement composition for later use comprising
   a) adding to an unset, partially hydrated cement composition an effective amount of from about 0.1 to 1 percent by wt. based on solid cement to substantially inhibit set of the cement composition for a period of time, of at least one polymethoxypolyphosphonic acid compound represented by the general formula:

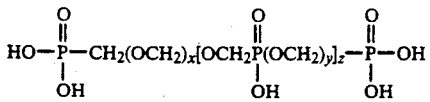

wherein x and y each independently represent an integer of from 1 to 3 and z is either 0 or 1, or the alkali salts thereof;

b) at the end of the inhibiting period of time, adding a cement hydration accelerating agent to the cement composition of a).

2. The method of claim 1 wherein step b) further comprises first mixing the inhibited cement composition of step a) with freshly prepared cement composition to form a combined cement composition and then add the accelerating agent.

3. The method of claim 1 wherein step b) further comprises adding the accelerating agent in combination with freshly prepared cement composition to the treated cement composition of step a).

4. The method of claim 2 wherein the treated cement composition of a) is mixed with freshly prepared cement composition in a weight ratio of from about 10:1 to 1:10.

5. The method of claim 1, 2, 3, or 4 wherein the major compound of the polymethoxy polyphosphonic acid is represented by the general formula wherein x is 1 and z is 0.

6. The method of claim 5 wherein the cement composition is selected from a mortar or concrete mix.

7. A cement composition admixture comprising an aqueous solution of alkali or alkaline earth metal salts of at least one polymethoxy polyphosphonic acid having the general formula:

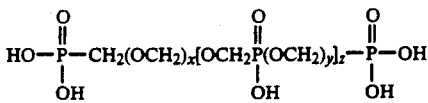

wherein x and y each independently represent an integer of from 1 to 3 and z is either 0 or 1 and at least one cement agent selected from cement retarding agents, cement water reducing agents, strength enhancers or superplasticizers.

8. The method of claim 1 wherein the period of time to substantially inhibit set of the cement is from 24 to 60 hours.

9. The method of claim 3 wherein the treated cement composition is a) is mixed with freshly prepared cement composition in a weight ratio of from about 10:1 to 1:10.

10. The method of claim 8 or 9 wherein the major compound of the polymethoxy polyphosphonic acid is represented by the general formula wherein x is 1 and z is 0.

* * * * *